United States Patent [19]

Mackenzie et al.

[11] Patent Number: 5,546,266

[45] Date of Patent: Aug. 13, 1996

[54] CIRCUIT INTERRUPTER WITH CAUSE FOR TRIP INDICATION

[75] Inventors: Raymond W. Mackenzie, Pittsburgh; John A. Wafer, Beaver, both of Pa.

[73] Assignee: Eaton Corporation, Cleveland, Ohio

[21] Appl. No.: 265,540

[22] Filed: Jun. 24, 1994

[51] Int. Cl.[6] .................................................. H02H 3/33
[52] U.S. Cl. ........................... 361/93; 361/115; 340/638
[58] Field of Search ............................. 361/45, 48, 79, 361/95, 93, 115; 340/638, 644

[56] References Cited

U.S. PATENT DOCUMENTS

| | | | |
|---|---|---|---|
| 4,081,852 | 3/1978 | Coley et al. | 361/45 |
| 4,209,761 | 6/1980 | Klein et al. | 335/17 |
| 4,344,100 | 8/1982 | Davidson | 361/45 |
| 4,752,853 | 6/1988 | Matsko et al. | 361/94 |
| 4,794,356 | 12/1988 | Yun et al. | 335/13 |
| 5,224,006 | 6/1993 | Mackenzie et al. | 361/45 |

Primary Examiner—Jeffrey A. Gaffin
Assistant Examiner—Stephen Jackson
Attorney, Agent, or Firm—Martin J. Moran

[57] ABSTRACT

In a circuit interrupter which has multiple electronic trip circuits, such as ground fault and arcing fault trip circuits, indicators such as LED's produce an indication of the cause of the trip. The trip signals are latched to provide a continuing trip indication and ORed to actuate the trip device. In one embodiment SCR's connected in series with the indicator LED's serve as the latches and are connected in parallel to the trip device to provide the OR function. In other embodiments, flip-flops serve as the latches. In one such embodiment, the indicator LED's are connected from the respective flip-flops in parallel to the trip device to provide the OR function. In another such embodiment the flip-flops actuate the trip device and turn on switches actuating the LED's These switches energizing the cause of trip LED's are disabled until the contacts open to assure operation of the trip device. Alarms can be coupled to the trip circuit by additional LED's, preferably IR LED's, connected in series with the indicator LED's.

14 Claims, 3 Drawing Sheets

CIRCUIT INTERRUPTER WITH CAUSE FOR TRIP INDICATION

BACKGROUND OF THE INVENTION

1. Field of the Invention

This invention relates to circuit interrupters having cause for trip indications, and has particular application to circuit interrupters having electronic trip circuits, such as sputtering arc and ground fault trip circuits in addition to thermal and magnetic trip devices.

2. Background of Information

Circuit breakers used in residential and light commercial applications typically house compact thermal and magnetic trip units in small molded housings of standardized dimensions designed for mounting in standardized load centers. The magnetic trip unit provides short circuit protection and the thermal trip unit protects against sustained overcurrents which cause excessive heating of the protected electrical system.

There is a growing trend toward also providing protection from ground faults in these small circuit breakers. Such protection is implemented by compact electronic circuits which are housed within compartments in the molded casing of the circuit breaker.

Recently, there has been interest in also providing protection against sputtering arc faults. Such faults occur for example when bared conductors, such as the strands of a braided extension cord, come into contact. The repulsion forces generated by the shorted current force the contacting conductors apart, momentarily interrupting the current. The conductors then return to the contacting position, such as through mechanical forces originally bringing them into contact, and the process is repeated. Such sputtering arc faults do not generate fault currents of sufficient magnitude to trigger the magnetic trip unit, or even the thermal trip. However, they can cause a fire in an appropriate environment.

Electronic circuits which detect sputtering arc faults have been developed, and have been incorporated into the small circuit breakers, typically, together with the electronic ground fault circuit.

Currently, there is no means for distinguishing between the causes of trip in such circuit breakers.

SUMMARY OF THE INVENTION

It is a primary object of the present invention to provide a circuit interrupter which provides an indication of the cause of trip in a circuit breaker which includes an arcing fault trip function.

Accordingly, in a circuit interrupting device which has an arcing fault detector which generates an arcing fault trip signal and a second electronic circuit which detects another type of fault, such as a ground fault, and generates a second trip signal., either of which results in opening of the contacts of the circuit interrupting device, the response means which opens the contacts includes indicator means providing an indication of which trip signal caused opening of the contacts. In order to provide this indication, latch means latch the respective trip signals. The latch signals are then used to turn on indicator means, such as preferably LED's. The latched signals are also ORed to turn on a switch, such as an SCR, which energizes a trip solenoid to open the contacts.

In one embodiment of the invention, the latch means comprises SCR's having their gates connected to the associated electronic trip circuit and being connected in series with the associated LED. These latching SCR's are connected in parallel to the gate of the SCR which actuates the trip device in order to provide the OR function for tripping in response to either electronic trip signal.

In other embodiments of the invention, the latching function is performed by flip-flops. In one such embodiment, the indicator LED's are connected to the outputs of the flip-flops and in parallel to the gate of the SCR actuating the trip device in order to provide the OR function.

In yet another embodiment of the invention, the outputs of the latch means are ORed to turn on the SCR actuating the trip device. The outputs of the latch means are also used to turn on switches which energize the respective LED indicators. In this embodiment, gates are preferably provided between the latch means and the switches turning on the LED's so that the switches are only enabled after the circuit breaker is open, and thus, full power is available for opening the contacts. This is accomplished by a circuit which senses the voltage on the load side of the circuit breaker and disables the switches turning on the LED's, until after this voltage goes to zero with the opening of the circuit breaker.

As another aspect of the invention, an alarm can be coupled to the indicator circuits by providing an additional LED in series with the indicator LED's. This additional LED, which is preferably an IR LED, turns on a photodetector which actuates the alarm, so that the trip circuit is electrically isolated from the alarm circuit.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENT

The invention will be described as applied to a conventional residential circuit breaker such as that described in U.S. Pat. No. 4,081,852 which is herein incorporated by reference. That circuit breaker includes a thermo-magnetic overcurrent trip mechanism and a ground fault detector mounted in side-by-side compartments within a molded housing. The ground fault detector includes a trip solenoid having a plunger which extends through the wall between the two compartments in the molded housing to actuate the thermo-magnetic trip mechanism to trip the circuit breaker in response to a ground fault.

Figure 1:
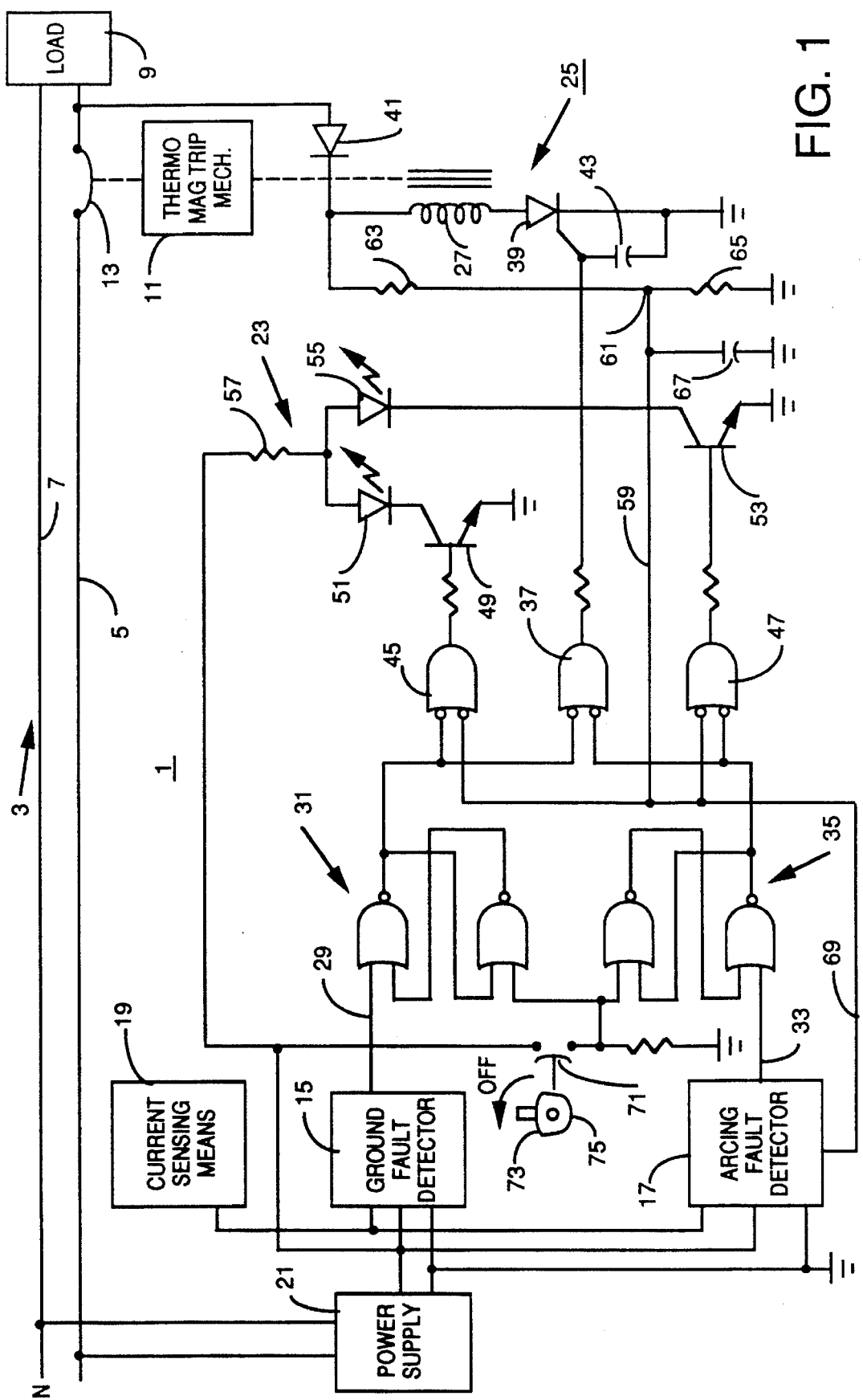
FIG. 1 is a schematic circuit diagram, partly in block diagram form, of a circuit interrupting device in accordance with a first embodiment of the invention.

Referring to FIG. 1, the circuit breaker 1 of the invention protects an electrical system 3 which includes a line conductor 5 and a neutral conductor 7 which provide electric power to a load 9.

The circuit breaker 1 includes a thermo-magnetic trip mechanism 11 which responds to line-to-line short circuits and sustained overcurrents to open separable contacts 13 in the line conductor 5 in a manner discussed in U.S. Pat. No. 4,081,852.

The circuit breaker 1 has a ground fault detector 15 and an arcing fault, or sputtering arc detector 17. In the exemplary circuit breaker, the ground fault detector 15 is of the dormant oscillator type which utilizes current sensors 19 to sense both line-to-ground and neutral-to-ground faults. The arcing fault detector 17 utilizes the same current sensors 19 as the ground fault detector. A combined dormant oscillator-type ground fault detector and arcing fault detector is disclosed in U.S. Pat. No. 5,224,006 which is hereby incorporated by reference. The sputtering arc fault detector described in that patent utilizes the di/dt signal generated by a low mu sensing coil coupled to the neutral conductor. This di/dt signal is bandwidth limited, full wave rectified and compared with a reference signal to generate an arcing fault trip signal. The bandwidth is selected to provide a selected sensitivity of the trip signal to sinusoid currents associated with overcurrent faults and step currents associated with sputtering arc faults. Alternatively, the arc fault detector disclosed in U.S. patent application Ser. No. 023,435, filed on Feb. 26, 1993, now abandoned and entitled "Circuit Breaker Responsive to Repeated In-rush Currents Produced by a Sputtering Arc Fault" could be utilized. This sputtering arc fault detector responds to repeated excursions of the bandwidth limited di/dt signal above the threshold to distinguish sputtering arc faults from in-rush currents generated by connecting certain loads to the protected conductors.

A power supply 21 provides a regulated DC power for the ground fault detector 15, the arcing fault detector 17 and indicator circuitry 23. The latter is made part of a response circuit 25 which also includes a shunt coil 27, which as will be described, trips the contacts 13 open in response to the detection of a ground fault or arcing fault.

When the ground fault detector 15 detects a fault between either the line conductor 5 and ground or the neutral conductor 7 and ground, a ground fault trip signal is generated on the output lead 29. This ground fault trip signal, which goes high upon detection of a ground fault, is latched by an RS flip-flop 31 composed of a pair of NOR gates. Similarly, the arcing fault detector 17 generates an arcing fault trip signal on lead 33 which goes high upon the detection of an arcing fault. This arcing fault trip signal is latched by the RS flip-flop 35.

The outputs of the flip-flops 31 and 35 are applied to a negative NOR gate 37, which turns on an SCR 39. The SCR 39 is connected to the load side of the line conductor 5 through a diode 41 and the trip solenoid 27 so that turn-on of the SCR 39 energizes the trip solenoid 27 to open the contacts 13. The gate of the SCR 39 is protected from transients by a noise suppressing capacitor 43. The trip solenoid 27 is deenergized when the contacts 13 open. As an alternative, the trip signals from the detectors 15 and 17 can be connected through a positive OR gate (not shown) to turn on the SCR 39.

The cause of trip indication is generated by the indicator circuit 23. This circuit includes a negative NAND gate 45 having one input provided by the latch 33, and another negative NAND gate 47 having one input connected to the RS flip-flop 35. The negative NAND gate 45 controls a transistor 49 which turns on an LED 51 in response to a ground fault trip. Similarly, the negative NAND gate 47 controls transistor 53 to turn on a second LED 55 in response to an arcing fault trip signal. The LED's 51 and 55 receive current from the power supply 21 through current limiting resistor 57. The two discrete LED's 51 and 55 can be replaced by a two-color LED, if desired.

In order not to load the power supply 21 until after the trip is accomplished, the second inputs to the negative NAND gates 45 and 47 are commonly connected through the lead 59 to a point 61 which senses the voltage on the load side of the circuit breakers. The logic level sensing voltage is generated by the voltage divider formed by the resistors 63 and 65 connected in series between the load side of the line conductor 5 and ground. Filtering is provided by the capacitor 67. The voltage on the lead 59 inhibits or blocks turn-on of the LED's 51 and 55 until after the trip occurs, so that current is not diverted from driving the SCR gate 39. While not necessary, a lead 69 can be connected from the tap point 61 to the arcing fault detector 17 to disable the arcing fault detector after a trip so that more current is available for operating the LED's 51 and 55. The ground fault detector 15 may also be disabled such as by a transistor switch (not shown), provided that care is taken not to have an excessively long charging time constant in the load side voltage detection path, so that excessive delay is not introduced into the ground fault circuit operation when the circuit breaker is closed.

As the LED's 51 and 55 are energized from the line side of the circuit breaker, they remain illuminated after the trip. The LED's are turned off by resetting the flip-flops 31 and 35. This is accomplished by a common reset switch 71. Preferably, the reset switch 71 is mechanically operated by the circuit breaker handle 73, such as through the camming surface 75, so that the switch 71 is closed when the handle is in the "off" position.

Figure 2:
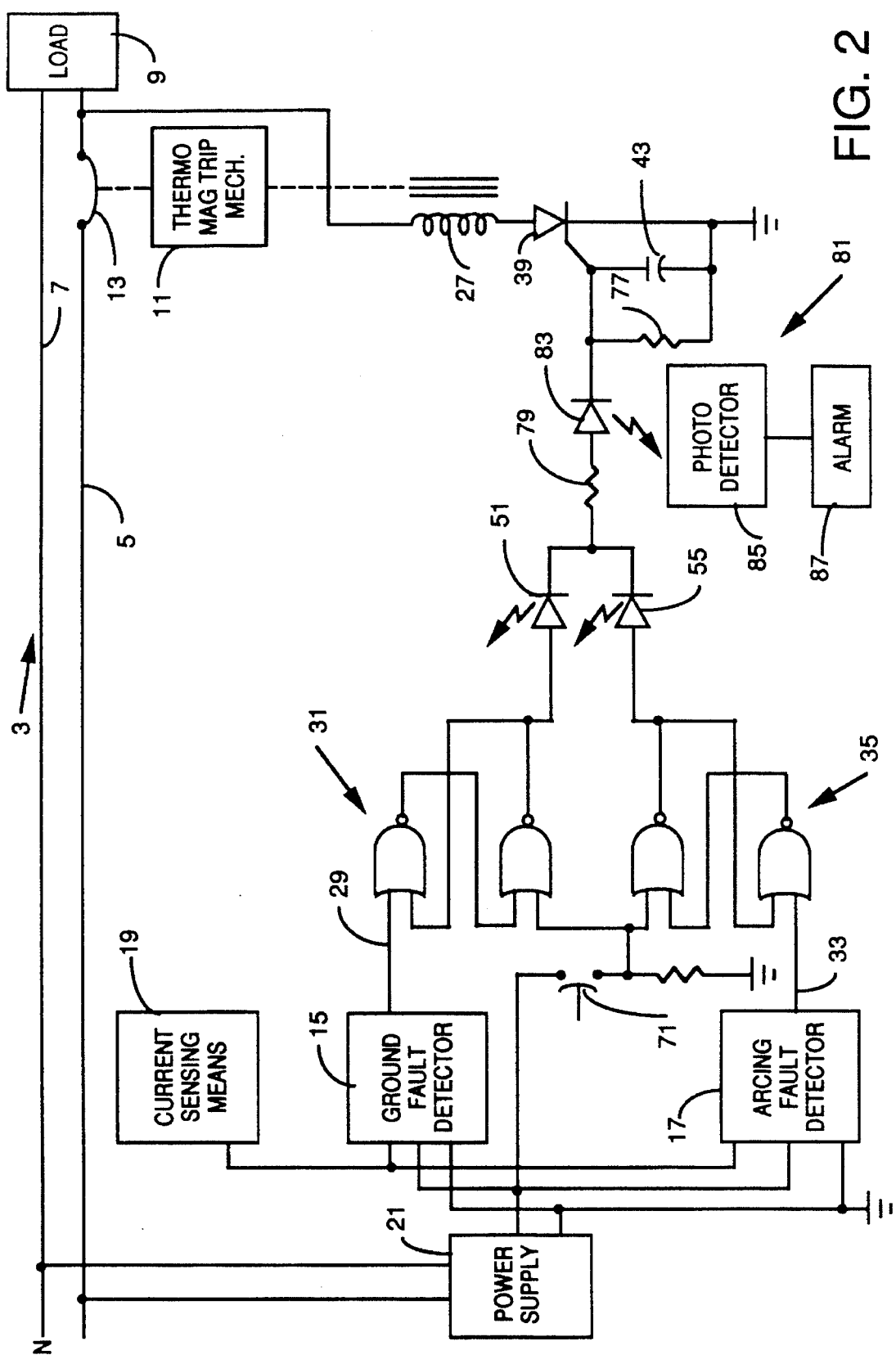
FIG. 2 is a schematic circuit diagram, partly in block diagram form, a circuit interrupting device in accordance with a second embodiment of the invention.

FIG. 2 illustrates an alternative embodiment of the invention. The circuit for this embodiment is identical to that of the embodiment shown in FIG. 1 up through the RS flip-flops 31 and 35, but is greatly simplified beyond that point. The LED's 51 and 55 are connected to provide the OR function to drive the SCR 39. The resistors 77 and 79 provide the proper voltage for turn-on of the SCR 39. As an option, the embodiment of FIG. 2 illustrates the addition of an alarm circuit 81. This alarm includes an additional LED 83 connected in series with the LED's 51 and 55. The LED 83 triggers a photo detector 85 which in turn energizes an alarm 87 to generate an alarm signal. The LED 83 and photo-detector 85 form an opto isolator which isolates the alarm circuit from the trip circuit. The LED 83 is mounted behind the load center front panel (not shown) in which the circuit breaker is mounted together with the photo-detector 85 to protect the photo-detector from bright ambient light. It is preferred that the LED 83 be an IR device, as the commonly used silicon photo-detectors 85 have a spectral sensitivity peak which closely matches the emission peak of the IR LED's. The common IR LED 83 provides an alarm for either the ground fault trip or the arcing fault trip. If preferred, a separate opto-coupler with an associated IR LED can be connected in series with each of the LED's 51 and 55 to generate alarms which distinguish between the ground fault trip and the arcing fault trip. Either of these alarm circuits can be provided with any of the embodiments of the invention.

If an electronic circuit is used in place of the thermal-magnetic trip device, a third cause of trip function may be provided in the embodiment shown in FIGS. 1 and 2 by adding an additional RS flip-flop, an additional negative NAND gate, transistor and LED, and in the case of the embodiment of FIG. 1, changing the NOR gate 37 to a three input device. Alternatively, two LED's can be used to indicate three functions by having the third function light both LED's. This requires two OR gates, connected so that one LED is energized for trip functions 1 or 3, while the other LED is energized for functions 2 or 3. When multiple LED's are to be energized at the same time, then some or all of the series resistance must be placed in series with each LED, to insure current sharing.

Figure 3:
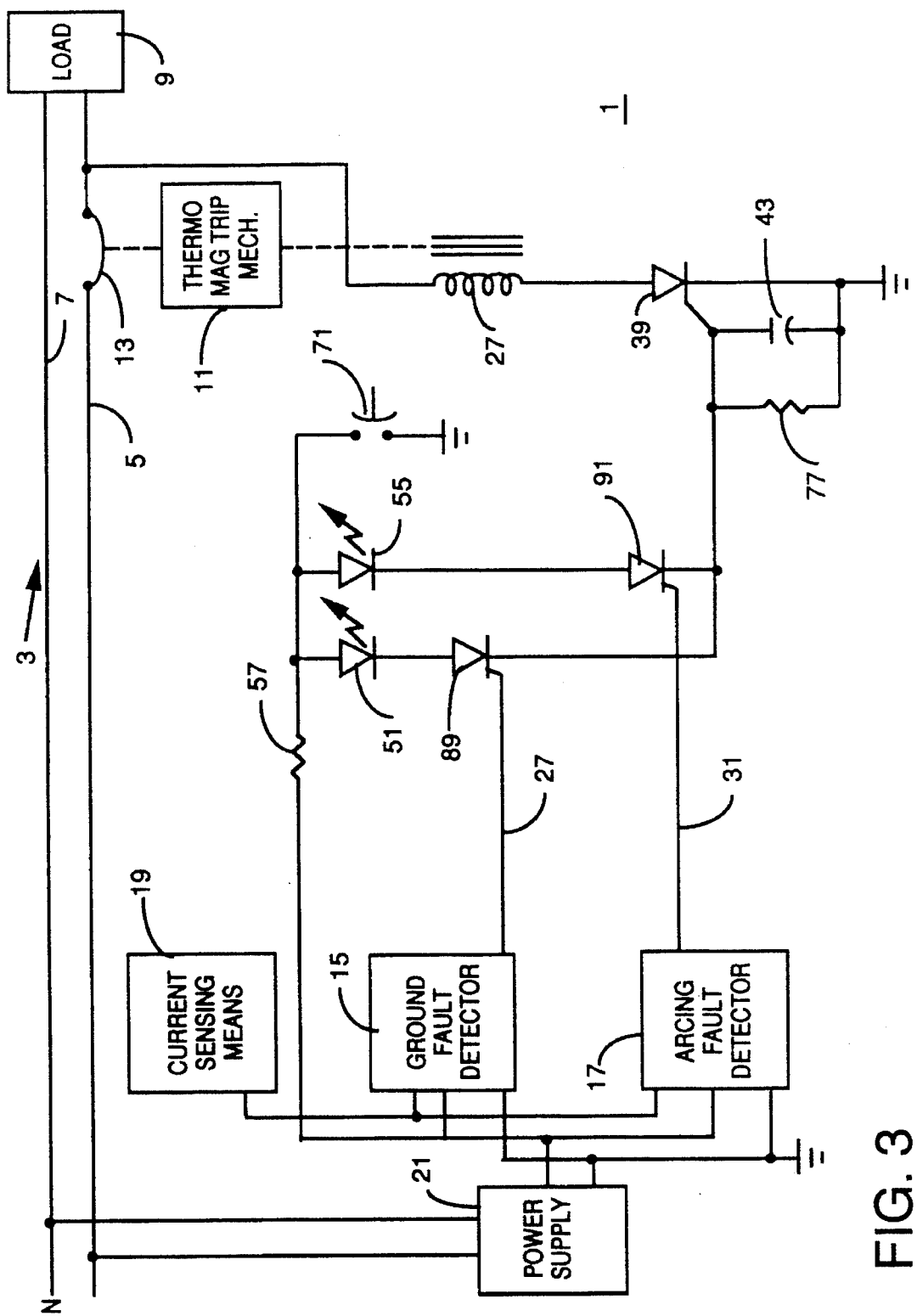
FIG. 3 is a schematic circuit diagram, partly in block diagram form of a circuit interrupting device in accordance with a third embodiment of the invention.

FIG. 3 shows a further simplification of the invention wherein the display latching functions are provided by SCR's which drive the indicating LED's. Thus, as shown in FIG. 3, the SCR 89 when turned on by a trip signal generated by the ground fault detector 15 latches the LED 51 on. Similarly, the SCR 91 latches the LED 55 on in response to a trip signal from the arcing fault detector 17. Additionally, the SCR's 89 and 91 provide the OR function for turn-on of the SCR 39. In this circuit, the reset switch 71 is connected in parallel with the SCR's 89 and 91 to bypass current around these SCR's and therefore turn them off. As in the case of the embodiment shown in FIG. 2, IR LED's may be used in series with the visible light LED's 51 and 55 to provide coupling to an alarm circuit.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed:

1. A circuit interrupting device for connecting a protected electrical system to an ac power supply, said device comprising:

separable contact means, having a line side connected to said ac power supply and a load side connected to said protected electrical system;

sensing means sensing current supplied to said protected electrical system through said separable contact means;

first electronic trip signal generating means responsive to said sensing means for generating a trip signal in response to first current conditions in said protected electrical system;

second electronic trip signal generating means responsive to said sensing means for generating a second trip signal in response to second current conditions indicating a sputtering arc fault in said protected electrical system; and response means responsive to said first and second trip signals for opening said separable contact means to interrupt current to said protected electrical system and for providing an indication of which trip signal opened said separable contact means, said response means comprising inhibiting said indication of which trip signal opened said separable contact means until after said separable contacts open in response to a trip signal.

2. The circuit interrupting device of claim 1 wherein said response means comprises a trip coil device for opening said separable contacts when energized, a gate controlled switch for energizing said trip coil device when turned on, first latch means for latching said first trip signal second latch means for latching said second trip signal, first light emitting diode (LED) means connected between said first latch means and said gate controlled switch for turning on said gate controlled switch and generating an indication of a trip in response to said first current conditions when said first trip signal is latched, and second LED means connected between said second latch means and said gate controlled switch for turning on said gate controlled switch and generating an indication of a trip in response to a sputtering arc fault current conditions when said second trip signal is latched.

3. The circuit interrupting device of claim 2 wherein said response means further includes reset means unlatching said first and second latch means when actuated.

4. The circuit interrupting device of claim 1 wherein said response means includes a trip coil device for opening said separable contacts when energized, a gate controlled switch energizing said trip coil device from said load side of said separable contacts when turned on, first latch means for latching said first trip signal, second latch means for latching said second trip signal, means connecting said first and second latch means to said gate controlled switch to turn said gate controlled switch on in response to latching of either of said first and second trip signals, first indicator means generating an indication of said first trip signal when turned on, first switch means responsive to said first latching means for turning on said first indicator means when said first trip signal is latched, second indicator means generating an indication of said second trip signal when turned on, and second switch means responsive to said second latching means for turning on said second indicator means when said second trip signal is latched.

5. The circuit interrupting device of claim 4 wherein said first switch means includes blocking means blocking turn on of said first indicator means until after said trip coil device opens said separable contacts, and wherein said second switch means includes blocking means blocking turn on of said second indicator means until after said trip coil device opens said separable contacts.

6. The circuit interrupting device of claim 1 wherein said response means comprises a trip coil device for opening said separable contact means, a gate controlled switch connecting said trip coil device to said load side of said separable contacts, first latch means latching said first trip signal, second latch means latching said second trip signal, and means connecting said first and second latch means to said gate controlled switch to turn said gate controlled switch on to energize said trip coil device and open said separable contacts in response to latching of either of said first and second trip signals, first indicator means responsive to latching of said first trip signal for generating an indication of a trip in response to said first current conditions and second indicator means responsive to latching of said second trip signal for generating an indication of a trip in response to a sputtering arc fault.

7. The circuit interrupting device of claim 6 wherein said device includes a dc power supply, wherein said first latch means is a first SCR having a gate to which said first trip signal is applied, wherein said second latch means is a second SCR having a gate to which said second trip signal is applied, wherein said gate controlled switch is a third SCR having a gate, wherein said means connecting said first and second latching means to said gate controlled switch comprises means connecting said first and second SCR's in parallel between said dc power supply and said gate of said third SCR and wherein said first indicator means is connected in series with said first SCR, and said second indicator means is connected in series with said second SCR.

8. The circuit interrupting device of claim 7 wherein said first and second indicators are light emitting diodes.

9. The circuit interrupting device of claim 7 wherein said device further includes reset means connected in parallel with said first and second SCRs for shunting current around said first and second SCR's to turn said first and second SCRs off when actuated.

10. A circuit interrupter for connecting a protected ac electrical system to an ac power supply, said interrupter comprising:

separable contact means having a line side connected to said ac power supply and a load side connected to said protected ac electrical system;

magnetic trip means responsive to short circuit currents through said separable contacts for opening said separable contacts;

thermal trip means responsive to sustained overcurrents through said separable contacts for opening said separable contacts;

electronic trip means responsive to predetermined current conditions at said separable contacts for opening said separable contacts; and indicator means connected to said electronic trip means for generating an electronic trip indication when said contacts are opened by said electronic trip means, said indicator means including means blocking generation of said electronic trip indication until after said separable contact means are opened in response to a trip signal.

11. The circuit interrupter of claim 10 wherein said electronic trip means has a dc power supply powering said detector means and wherein said means blocking generation of said electronic trip indication includes means disconnecting said dc power supply from said detector means after said separable contacts are opened.

12. The circuit interrupter of claim 10 wherein said electronic trip means comprises current sensing means sensing current flowing through said separable contacts, detector means connected to said current sensing means for generating a trip signal in response to said predetermined current conditions, latch means for latching said trip signal, and a trip device responsive to latching of said trip signal for opening said separable contacts, said indicator means being connected to said latch means for generating said electronic trip indication when said trip signal is latched.

13. The circuit interrupter of claim 12 wherein said electronic trip means includes a dc power supply, wherein said latch means is an SCR having a gate connected to said detector means and turned on by said trip signal, and including means connecting said SCR between said dc power supply and said trip device.

14. The circuit interrupter of claim 13 wherein said electronic trip means includes reset means for shunting current around said SCR when said reset means is actuated.

* * * * *